US008019166B2

(12) United States Patent
Cheng et al.

(10) Patent No.: US 8,019,166 B2
(45) Date of Patent: Sep. 13, 2011

(54) IMAGE DATA COMPRESSION METHOD AND APPARATUSES, IMAGE DISPLAY METHOD AND APPARATUSES

(75) Inventors: Long Cheng, Shanghai (CN); Yi Fe Fang, Shanghai (CN); Qi Liang, Shanghai (CN); Pu Yang, Shanghai (CN); Yi Zhen Xu, Shanghai (CN); Zhe Dong Mo, Shaoxing (CN)

(73) Assignee: International Business Machines Corporation, Armonk, NY (US)

( * ) Notice: Subject to any disclaimer, the term of this patent is extended or adjusted under 35 U.S.C. 154(b) by 1019 days.

(21) Appl. No.: 11/861,770

(22) Filed: Sep. 26, 2007

(65) Prior Publication Data

US 2008/0080778 A1 Apr. 3, 2008

(30) Foreign Application Priority Data

Sep. 29, 2006 (CN) .......................... 2006 1 0141340

(51) Int. Cl.
*G06K 9/36* (2006.01)
*G06K 9/46* (2006.01)
*G09G 5/36* (2006.01)
*G06F 9/44* (2006.01)
(52) U.S. Cl. ......... 382/232; 345/556; 717/125; 717/128
(58) Field of Classification Search .................. None
See application file for complete search history.

(56) References Cited

U.S. PATENT DOCUMENTS

| 5,168,554 | A | | 12/1992 | Luke | |
|---|---|---|---|---|---|
| 5,442,740 | A | | 8/1995 | Parikh | |
| 5,615,357 | A | * | 3/1997 | Ball | 703/21 |
| 5,819,094 | A | * | 10/1998 | Sato et al. | 717/131 |
| 5,862,381 | A | | 1/1999 | Advani et al. | |
| 6,057,839 | A | | 5/2000 | Advani et al. | |
| 6,947,052 | B2 | * | 9/2005 | Jeremiassen | 345/557 |
| 7,131,113 | B2 | * | 10/2006 | Chang et al. | 717/128 |
| 2004/0071356 | A1 | | 4/2004 | Sudharsanan et al. | |
| 2004/0205718 | A1 | * | 10/2004 | Reynders | 717/124 |
| 2006/0104525 | A1 | | 5/2006 | Gringeler et al. | |
| 2007/0089102 | A1 | * | 4/2007 | Erb | 717/140 |

OTHER PUBLICATIONS

James Evan Roberts "Tracevis: An execution trace visualization tool". Workshop on Modeling, Benchmarking and Simulation, 2005.*
A. Knupfer, W.E. Nagel "Compressible memory data structures for event-based trace analysis", Future generation Computer Systems 22, 2006, 359-368.*
A. Knupfer et al. "High performance event trace visualization", 13th Euromicro Conf. on Parallel, Distributed and Network-based Processing, 2005.*

(Continued)

*Primary Examiner* — Samir A Ahmed
*Assistant Examiner* — Li Liu
(74) *Attorney, Agent, or Firm* — Jennifer R. Davis; Steven Capella

(57) ABSTRACT

The image data compression method involves the performing of steps: a block dividing step for dividing a computer processor pipeline statistic image to be displayed into a plurality of blocks with predetermined block width and block height; a block list creating step for creating a block list for indexed blocks containing meaningful pixels in the divided blocks such that the indexed blocks are associated with each other, wherein the meaningful pixels are pixels corresponding to the computer processor pipeline raw trace data; and a pixel information compressing step for compressing original pixel information on the meaningful pixels in the indexed blocks and storing it in the block list. Apparatus for performing the method is also provided.

14 Claims, 9 Drawing Sheets

OTHER PUBLICATIONS

C. Weaver et al. "Performance analysis using pipeline visualization", IEEE International Symposium on Performance Analysis of Systems and Software (ISPASS-2001).*

Chris Weaver, et al., "Performance Analysis Using Pipeline Visualization," advanced Computer Architecture Laboratory, University of Michigan, 2001.

* cited by examiner

IMAGE DATA COMPRESSION METHOD AND APPARATUSES, IMAGE DISPLAY METHOD AND APPARATUSES

FIELD OF THE INVENTION

The present invention relates to an image data compression method, an image display method and corresponding apparatus, and more specifically, to an image data compression method, an image display method and corresponding apparatuses tailored for computer processor pipeline trace analysis data.

BACKGROUND OF THE INVENTION

There exist many kinds of software tools for analyzing characteristics of computer processor pipeline statistics to help a user to find possible performance hazards in code running in the processor pipeline, for example, a graphical pipeline observer recited in PERFORMANCE ANALYSIS USING PIPELINE VISUALIZATION, Advance Computer Architecture Laboratory University of Michigan, 2001 IEEE International Symposium on Performance Analysis of Systems and Software (ISPASS-2001), June 2001. These kinds of software tools analyze the characteristics of the computer processor pipeline statistics by reading raw trace data, generating a two-dimensional image representing the characteristics of the pipeline statistics based on the read raw trace data, and examining the generated two-dimensional image, so as to help the user to find potential performance problems. The user examines the two-dimensional image by performing operations such as scrolling the image along a horizontal or longitudinal axis of the two-dimensional image and zooming in/out the image. In general, height and width of the image generated based on the raw trace data are usually very large, say 100,000 pixels in both dimensions. An image compression technology is necessary when the image is generated based on so much data.

It is well known that, there are many image encoding or compression algorithms. These algorithms can be substantially divided into two categories: lossless compression algorithm and lossy image compression algorithm. Examples of lossless compression algorithms are run-length compression of LZW compression algorithms. Examples of lossy compression algorithms are JPEG or JPEG2000. Usually lossy compression algorithms can achieve much better compression ratio, but these algorithms cannot preserve completely and exactly all the details of the original image. In the usage scenario of examining the image generated from the computer processor pipeline statistics data, since all the details of the original image must be completely and exactly preserved, lossy compression algorithms cannot be used. However, the compression ratio of generic lossless compression algorithms is not high enough and thus memory space and computer processing power required to store and process the image greatly increase.

In order to reduce the memory space required in the course of storing and processing the image, the following digital image lossless compression method is known: dividing the image into a plurality of blocks, detecting a category of each block, and performing the image lossless compression using a different compression technology most suitable for the category of the block.

Although lossless compression technology reduces the memory space required in the course of storing and processing the image to a certain extent, since the compression is performed directed to each sub-block, a problem of low compression ratio exists.

In addition, as described above, in analyzing the characteristics of the computer processor pipeline statistics, the image generated based on the raw trace data is large in scale. Since the compression ratio of said lossless compression technology is not high, huge memory space and limited computer processing power render the whole pipeline image difficult to display. Even if the user views the image by scrolling or zooming in/out, the image cannot be scrolled or zoomed in/out in a very short response time, so a problem of poor convenience exists.

Generally, all the pixels in the image generated based on the computer processor pipeline statistics data are always regularly distributed, that is, most of the pixels are around the diagonal line from top-left to bottom-right. However, if each pixel in such a large-scaled image is encoded and processed as in the prior art, huge memory space and uncommon computer processing power are undoubtedly needed.

SUMMARY OF THE INVENTION

Therefore, in order to quickly compress and process a large amount of computer processor pipeline statistics data and smoothly display the image generated based on the computer processor pipeline statistics data with relatively small memory amount and processing amount, the present invention creates an image data lossless compression method especially tailored for the above regular pixel distribution. The image data lossless compression method created by the invention especially optimizes the regular image pixel distribution generated by the computer processor pipeline statistics, only reserves pixels relevant to the computer processor pipeline analysis in the large scale image and neglects pixels irrelevant to the computer processor pipeline analysis in the image, to thereby greatly reduce memory space and computer processing power required to store and process the image. In addition, an index is built on the image data directed to common operations used in the computer processor pipeline analysis, and thus a portion to be displayed can be quickly located in the generated large-scaled image.

The present invention does not generate the whole pipeline statistic image in a memory nor display it in a display window, but quickly locates and displays a small portion of the large-scaled image by indexing, allows the user to smoothly scroll view the image in both dimensions and to smoothly zoom in/out the image in a display device, and can display large-scaled pipeline trace data and save the memory space.

According to an aspect of the invention, there is provided a data compression method for computer processor pipeline trace data, comprising: a block dividing step for dividing a computer processor pipeline statistic image to be displayed into a plurality of blocks with predetermined block width and block height; a block list creating step for creating a block list for indexed blocks containing meaningful pixels in said divided blocks such that said indexed blocks are associated with each other, wherein said meaningful pixels are pixels corresponding to the computer processor pipeline raw trace data; and a pixel information compressing step for compressing original pixel information on the meaningful pixels in said indexed blocks and storing it in said block list.

According to another aspect of the invention, there is provided a data compression apparatus for computer processor pipeline trace data, comprising: a block dividing unit for dividing a computer processor pipeline statistic image to be displayed into a plurality of blocks with predetermined block width and block height; a block list creating unit for creating a block list for indexed blocks containing meaningful pixels in said divided blocks such that said indexed blocks are associated with each other, wherein said meaningful pixels are pixels corresponding to the computer processor pipeline raw trace data; and a pixel information compressing unit for compressing original pixel information on the meaningful pixels in said indexed blocks and storing it in said block list.

According to yet another aspect of the invention, there is provided an image display method based on computer processor pipeline trace data, comprising: a parameter acquiring step for acquiring parameters relevant to a display window, a display image and scale; a pixel information decompressing step for decompressing the compression information on said pixels to obtain original pixel information on said pixels; a pixel information scaling step for scaling the original pixel information obtained from decompression based on the acquired scale; and a pixel drawing step for drawing respective pixel points based on the obtained scaled pixel information.

According to further another aspect of the invention, there is provided an image display apparatus based on computer processor pipeline trace data, comprising: a parameter acquiring unit for acquiring parameters relevant to a display window, display image and scale; a pixel information decompressing unit for decompressing the compression information on said pixels to obtain original pixel information on said pixels; a pixel information scaling unit for scaling the original pixel information obtained from decompression based on the acquired scale; and a pixel drawing unit for drawing respective pixel points based on the obtained scaled pixel information.

Therefore, the image data compression method provided by the invention is especially tailored for the image generated based on the computer processor pipeline trace data (only saving non-background pixels so as to save the memory space). The image display method of the invention enables quickly locating (via indexing) and displaying a small portion of the large-scaled image that allows the user to smoothly scroll view the image in both dimensions and to smoothly zoom in/out the image in the display device.

Therefore, a first part of the invention is a data compression method for reading the pipeline raw trace data, building the index on the trace data and generating compressed image data based on the indexed raw trace data, and this compression algorithm is especially adapted to the image category generated based on the characteristics of the computer processor pipeline statistics. A second part of the invention is a method for locating a small portion of the display image in the display window and an algorithm for smoothly scrolling the display window in both dimensions and zooming in/out the display window.

One advantage of the invention is that, this new image compression algorithm can encode the large-scaled image with a very small memory and reserve all the image details. Another advantage of the invention is that, the display algorithm allows smooth scroll and zoom in/out when displaying the small portion of the image.

These and other aspects of the invention are described in further detail below.

DETAILED DESCRIPTION OF THE INVENTION

Figures 1, 2:
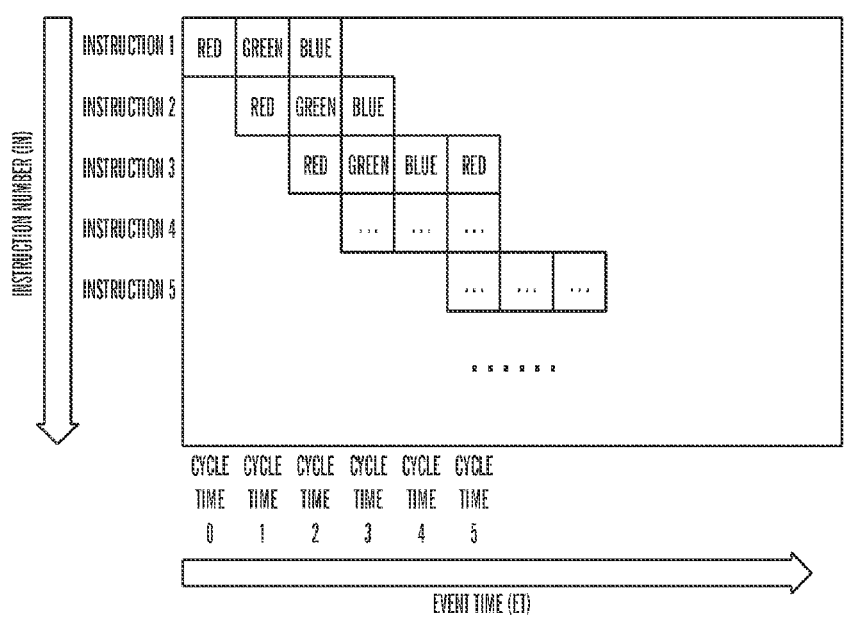
FIG. 1 shows a structural diagram of a pipeline trace raw data file.
FIG. 2 is a schematic diagram showing an overview of a pipeline trace event generated based on the pipeline trace raw data.

In the analysis of the computer pipeline statistics of the invention, the computer processor pipeline raw trace data generated by a large amount of special hardware and software systems serve as input data that constitute a pipeline trace raw data file. FIG. 1 shows the structure of the pipeline trace raw data file. The pipeline trace raw data comprise information on a number of pipeline trace events and information on the configuration of the pipeline trace data.

The information on each pipeline trace event EI comprises the following composite parts: Event Category EC, representing a category of the event, for example, one of categories such as indexing, decoding, transmitting, executing; Event Time ET, representing a processor clock cycle count at the generation of the event, the value of which starts from zero and incrementally increases with the increase of the elapsed processor clock cycle count; Instruction Number IN, representing a sequence number of a processor instruction to which the event belongs, the value of which also starts from zero and incrementally increases with the increase of the number of the processor instructions; Attached Information AI, representing the attached information on the processor instruction to which the event belongs, for example, including instruction encoding, an instruction read/write register, and so on.

Each instruction executed in the processor corresponds to a number of pipeline trace events. Thus, all these events have a same processor instruction number but possibly have different or same event categories and event times.

The information on the configuration of the pipeline trace data for example comprises a corresponding table between event categories and pixel colors.

Based on the above pipeline trace raw data, at a 1:1 scale, pixel point coordinates P (ET, IN) for each event is determined with Instruction Number IN as the longitudinal coordinate and Event Time ET (i.e. processor clock cycle count) as the horizontal coordinate, such that the pipeline trace event overview generated based on the specific pipeline trace raw data shown in FIG. 1 is drawn in FIG. 2, where ET>=0 and IN>=0. As shown in FIG. 2, the pipeline trace event overview consists of two kinds of pixels, namely:

(1) background pixels, i.e., all the pixels displayed in a background color in the image; and
(2) non-background pixels, i.e., all the pixels displayed in a non-background color in the image.

At a 1:1 scale, each non-background pixel corresponds to a pipeline trace event and thus the non-background pixels can also be referred to as pipeline trace event pixels. At a higher scale, a pixel point may represent event information in a certain area.

The color of each pipeline trace event pixel is determined by its Event Category EC. The corresponding table between event categories and colors is acquired from said pipeline trace data configuration information. The color of the pipeline trace event pixel is different from that of a background pixel. In the present embodiment, as shown in the color corresponding table in FIG. 1, the non-background pixels of Event Category 1 are displayed in red; the non-background pixels of Event Category 2 are displayed in green; the non-background pixels of Event Category 3 are displayed in blue.

As described above, the pipeline trace event overview generated based on the pipeline trace raw data generally consists of background pixels and non-background pixels. In the image data compression method of the invention, the whole image is divided into a plurality of blocks, and a so-called "block list" data structure is created for the divided blocks. By using the created block list to compress and index only the non-background pixels in each block, the memory space is greatly saved and the computer processing amount is reduced.

Figure 3:
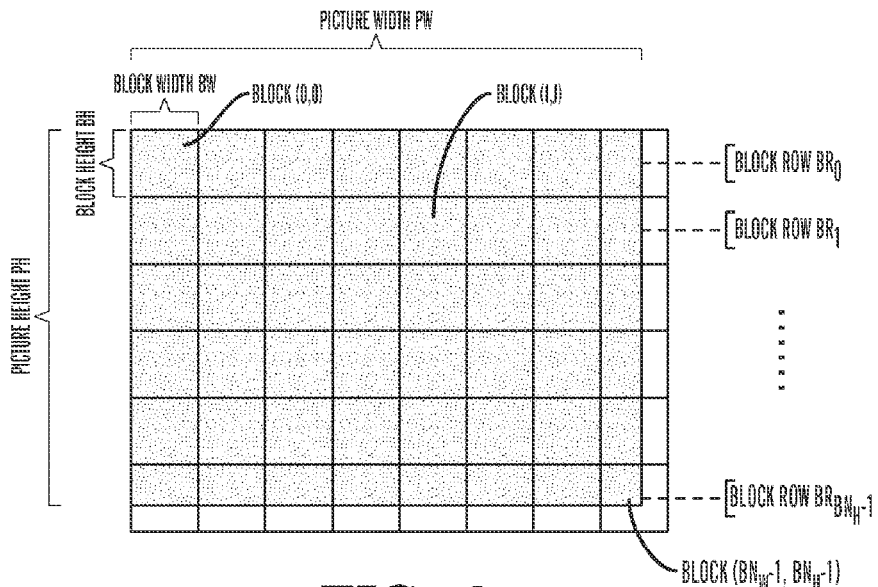
FIG. 3 is a schematic diagram showing the division of the whole display image into a plurality of small rectangular blocks.

FIG. 3 shows a schematic diagram of dividing the whole display image into a plurality of small rectangular blocks. First, two constant values are defined: block width BW and block height BH, where the block width BW represents the processor clock cycle count contained in each block and the block height BH represents the instruction number contained in each block. Specific values of the block width BW and block height BH are selected by the user according to specific pipeline data. In general, BW and BH are selected to be equal values, i.e. dividing the image into square blocks.

Then, the width of the whole image PW is divided according to the block width BW to obtain a block number in width $BN_W$, and the height of the whole image PH is divided according to the block height BH to obtain a block number in height $BN_H$. As above, a pixel corresponds to a pipeline trace event, so a pixel count of the whole image in the direction of the width PW also corresponds to the processor clock cycle count contained in the whole image, and a pixel count in the direction of the height PH corresponds to the instruction number contained in the whole image, and the absolute values of the pixel counts in the direction of the width PH and in the direction of the height PH do not exceed $2^8=256$, such that, as later to be described, only two bytes are needed to perform encoding of a pixel so as to achieve the effect of saving memory space.

When the image width PW cannot divide exactly the block width BW or the image height PH cannot divide exactly the block height BH, the image width PW and image height PH are automatically increased to a next integer that can divide exactly the block width BW or block height BH, that is, the width and height of the whole image increase. The extra effect brought by such an increasing operation is to introduce a few extra background color blocks at an edge of the image, which does not affect the generation of the image data of normal non-background pixels, as shown in the blocks with non-hatched portions in FIG. 3. In this way, the whole image (PW*PH) is logically divided into $BN_W*BN_H$ small rectangular blocks, and each block is uniquely identified by an index pair [I, J], where $0 \leq I \leq BN_H-1$, and $0 \leq J \leq BN_W-1$. That is, each rectangular block is represented by BLOCK (I, J).

For the image thus divided into a plurality of blocks, some blocks contain both background pixels and non-background pixels, and some blocks contain only background pixels. If the blocks are stored and processed one by one, the huge amount of background pixels will obviously occupy a very large memory space, which goes against rapid image processing. Also, these background pixels have no practical sense in the computer pipeline statistic trace analysis adapted to the invention. In view of the above situation, the present invention compresses and processes only the blocks containing the non-background pixels in the image to achieve the effect of saving memory space. In addition, for the blocks containing the non-background pixels, the object of saving memory space can be further achieved by compressing and processing only the non-background pixels therein, i.e., discarding the background pixels in the blocks. Therefore, the present invention creates a block list data structure that stores only the compression information on the non-background pixels.

Figure 4:
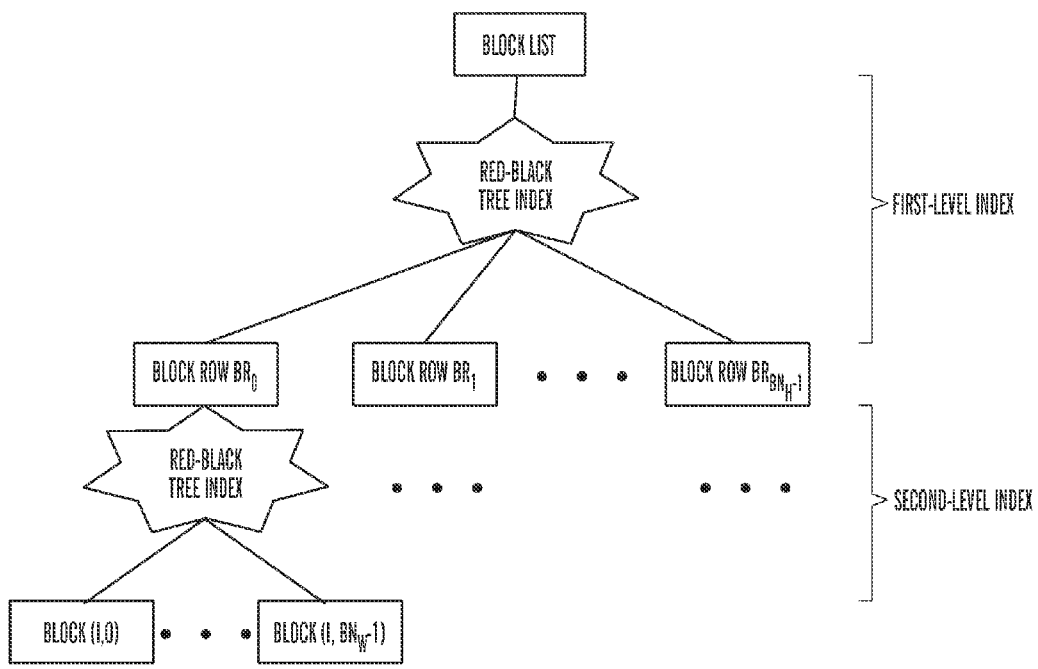
FIG. 4 shows a block list data structure.

The block list, as a data structure for saving individual blocks in the invention, is discussed below with reference to FIG. 4.

The block list is initialized to be null when the above creating process is initialized. As shown in FIG. 4, the block list is a set of a plurality of block rows $BR_I$, where $0 \leq I \leq BN_H-1$. These block rows are associated with each other by means of a block list red-black tree index structure. References to all the block rows can be obtained by means of this block list red-black tree index structure.

Each block row comprises: (1) a sequence number for uniquely identifying this block row, e.g. I as shown in FIG. 3; and (2) red-black tree index data directed to all the blocks belonging to the block row. That is, the block row $BR_I$ ($0 \leq I \leq BN_H-1$) saves index information on the data structure of all the blocks in the block row according to the index pair [I, J]. The reference to each block can be obtained by means of this index information.

The block list will not create and record empty block rows. An "empty block row" means that this block row does not contain blocks having meaningful data, i.e., the block row does not contain the blocks having non-background pixels. Thus, as shown in FIG. 4, respective blocks BLOCK (I, J) in a block row are associated with each other by means of the block row red-black tree index, and then respective block rows in a block list are associated with each other by means of the block list red-black tree index, to thereby establish a block list.

Figure 5:
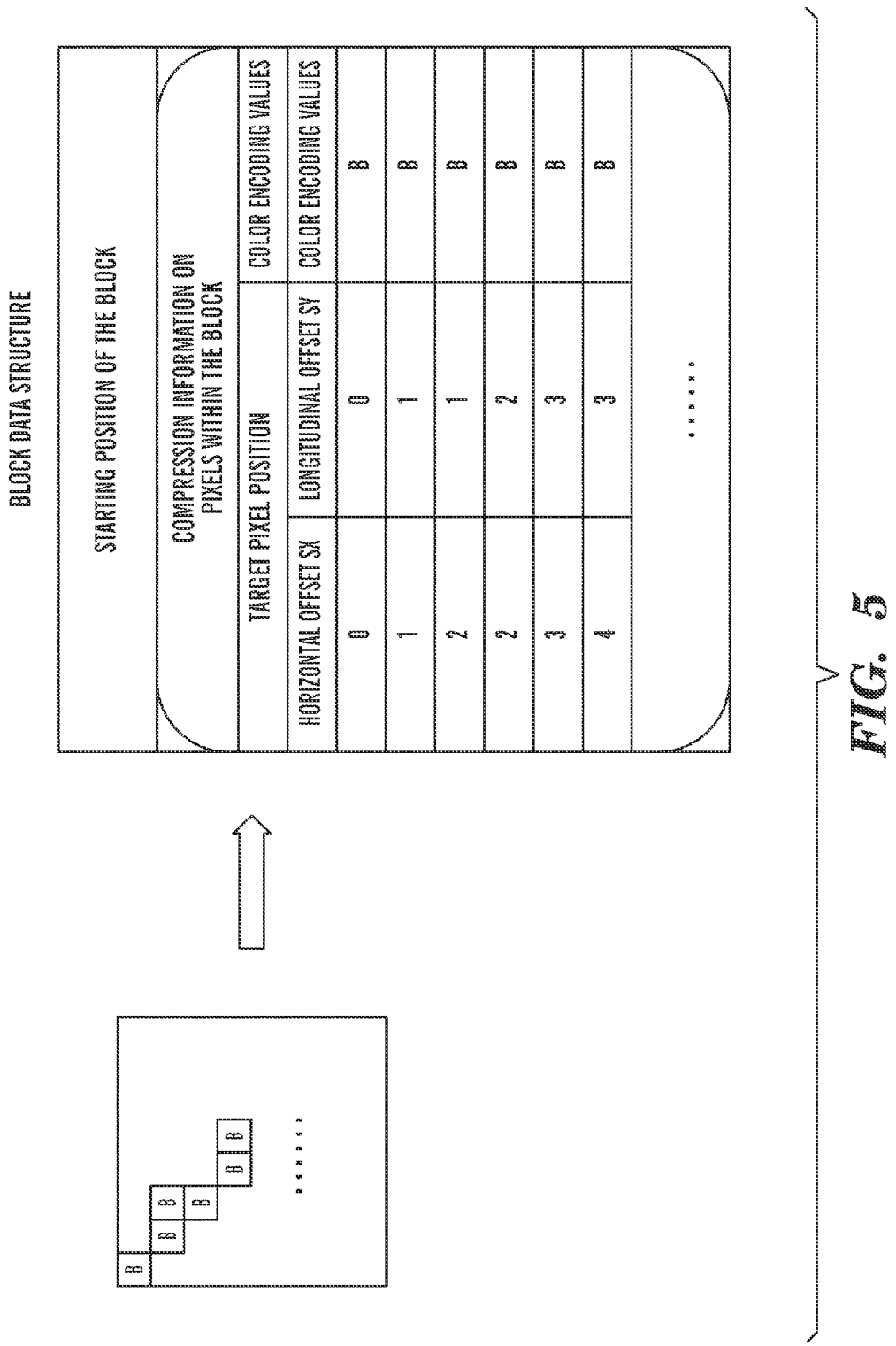
FIG. 5 is a schematic diagram showing positions of respective pixels in a block relative to a target pixel of the block.

FIG. 5 is a schematic diagram showing positions of respective pixels in a block relative to the target pixel in the block. The data structure of the block is discussed in detail below with reference to FIG. 5.

FIG. 5 (a) is a schematic diagram showing pixels of a certain block BLOCK (I, J) in FIG. 3. In the figure, each small square represents a pixel in the block, and all the pixels in the block are assumed to be black. The data structure of the block BLOCK (I, J) comprises: a position P (X0, Y0) of a top-left pixel of the block in the whole display image and compression information on all the non-background pixels contained in the block. Said compression information comprises target pixel positions of respective background pixels (relative coordinates in the block) an their color encoding values.

Figure 6:
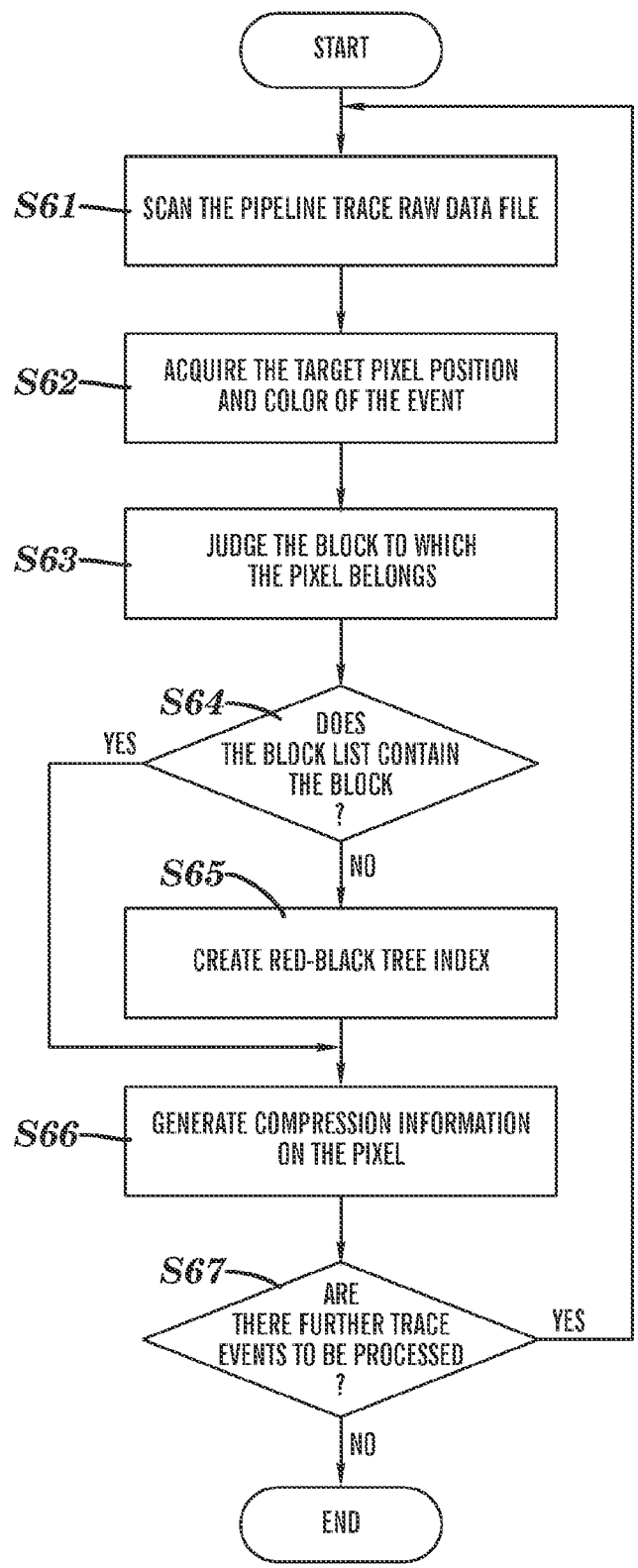
FIG. 6 is a flowchart of an image data compression method according to the invention.

The image data compression method according to the invention is discussed below with reference to FIG. 6, based on the block dividing scheme divided according to the schematic diagram of FIG. 3. FIG. 6 shows a flowchart of the image data compression method according to the invention.

First, in step S61, the pipeline trace raw data file as described before is scanned and one trace event is searched at a time.

In step S62, the target pixel position P(ET, IN) corresponding to the trace event is determined according to Event Time ET and Instruction Number IN contained in the pipeline trace event information EI, and the corresponding table between event categories and colors contained in the pipeline trace data configuration information is searched to determine the color corresponding to the trace event. Then, the process proceeds to step S63.

In step S63, the block to which each non-background pixel belongs is calculated for the pixel: dividing the instruction number IN of the trace event corresponding to the non-background pixel by the block height BH and taking an integer to obtain a row number M of the block to which the pixel belongs and dividing the event time ET of the trace event corresponding to the non-background pixel by the block width BW and taking an integer to obtain a column number N of the block to which the pixel belongs, i.e. M=MOD(IN/BH) and N=MOD(ET/BW). Thus, it is determined that the trace event of the pixel position P (ET, IN) belongs to the block BLOCK (M, N). Then, the process proceeds to step S64.

In step S64, it is determined whether or not the block BLOCK (M, N) is contained in the block list. If M and N are less than or equal to I and J in the red-black tree index pair [I, J] saved in the current block list, respectively, then the block BLOCK (M, N) is contained in the block list and the process proceeds to step S66 where the compression information on the pixel is saved in its respective BLOCK (M, N). On the contrary, if the index pair matched with [M, N] is not found in the current block list by means of the red-black tree index, this means that the block BLOCK (M, N) is not yet contained in the block list, and the process proceeds to step S65. In step S65, [I, J] is updated with [M, N] and the red-black tree index of the BLOCK (M, N) in the block list is created. Then, the process proceeds to step S66.

In step S66, the compression information on the pixel is generated and saved in its respective block. This is discussed with reference to the block data structure shown in FIG. 5 by taking example for Block (I, J). Assume that this block saves all the non-background pixels that have a display position P (X, Y), i.e., J*BW<=X<(J+1)*BW and I*BH<=Y<(I+1)*BH.

Since the generated pipeline trace statistic analysis image is very large in scale, if global coordinates, namely P (X, Y), of the pixel in the whole image is used, a number of bytes are needed to encode the coordinates, and this is very inconvenient. Therefore, the present invention converts the pixel position of each non-background pixel in a block into an offset relative to the top-left coordinates of the block, i.e. relative coordinates of the pixel relative to the block. In this way, if the size of the block is less than or equal to 256 pixels, only two bytes are needed to encode each pixel position.

The offset of the pixel P (X, Y) relative to the top-left coordinates of the block BLOCK (I, J) is calculated by:

$$SX=X-J*BW;$$

$$SY=Y-I*BH \quad (1)$$

If BW and BH are defined as follows: 0<=BW and BH<256, it is certain that 0<=SX and SY<256, so that only two bytes (one for each of SX and SY) are used to encode the offset of each pixel.

Thereby, by converting the original pixel position (i.e. global coordinates relative to the whole display image) of the pixel P (X, Y) into the target pixel position (i.e. relative coordinates relative to each block), the memory space required to store the pixels is compressed.

Then, the color value of the non-background pixel P(X, Y) is encoded. The used color value encoding algorithm varies as required. A simple way is to directly encode the pixel value to red/green/blue color components. A common encoding way comprises: a) respectively using a byte to encode the red, green and blue components, in which case, 3 bytes in all are needed to encode a color; b) respectively using 5 bits to encode the blue, green and blue components, in which case, 15 bits in all, i.e., 2 bytes, are needed to encode a color. However, the memory space required by the above way is relatively large. According to the characteristics of the computer processor pipeline visualization process, not many different colors are needed to generate the image. Therefore, we create a global palette including all possibly used color values. All the color codes in the block data structure are directed to indexes of the colors in the global palette.

Thus, the target pixel position and its color encoding value of the non-background pixel P(X, Y) are generated, and the generated target pixel position and its color encoding value, as the compression information on the non-background pixel, are saved in the block BLOCK (I, J).

Then, the process proceeds to step S67 where it is judged whether or not there are trace events to be processed in the pipeline trace raw data file. If it is judged that there are no trace events to be processed in the pipeline trace raw data file ("No" in step S67), the image data compression process immediately ends. If it is judged that the pipeline trace raw data file contains other trace events to be processed ("Yes" in step S67), the process returns to step S61 to find a next corresponding trace event to be processed from the pipeline trace raw data file, and step S61 through step S66 are repeated.

The image data compression method of the invention has been described above in detail with reference to FIG. 6. The image data decompression method according to the invention is discussed below with reference to FIG. 7. The image data decompression method of the invention is an inverse process of the above described image data compression method.

Figure 7:
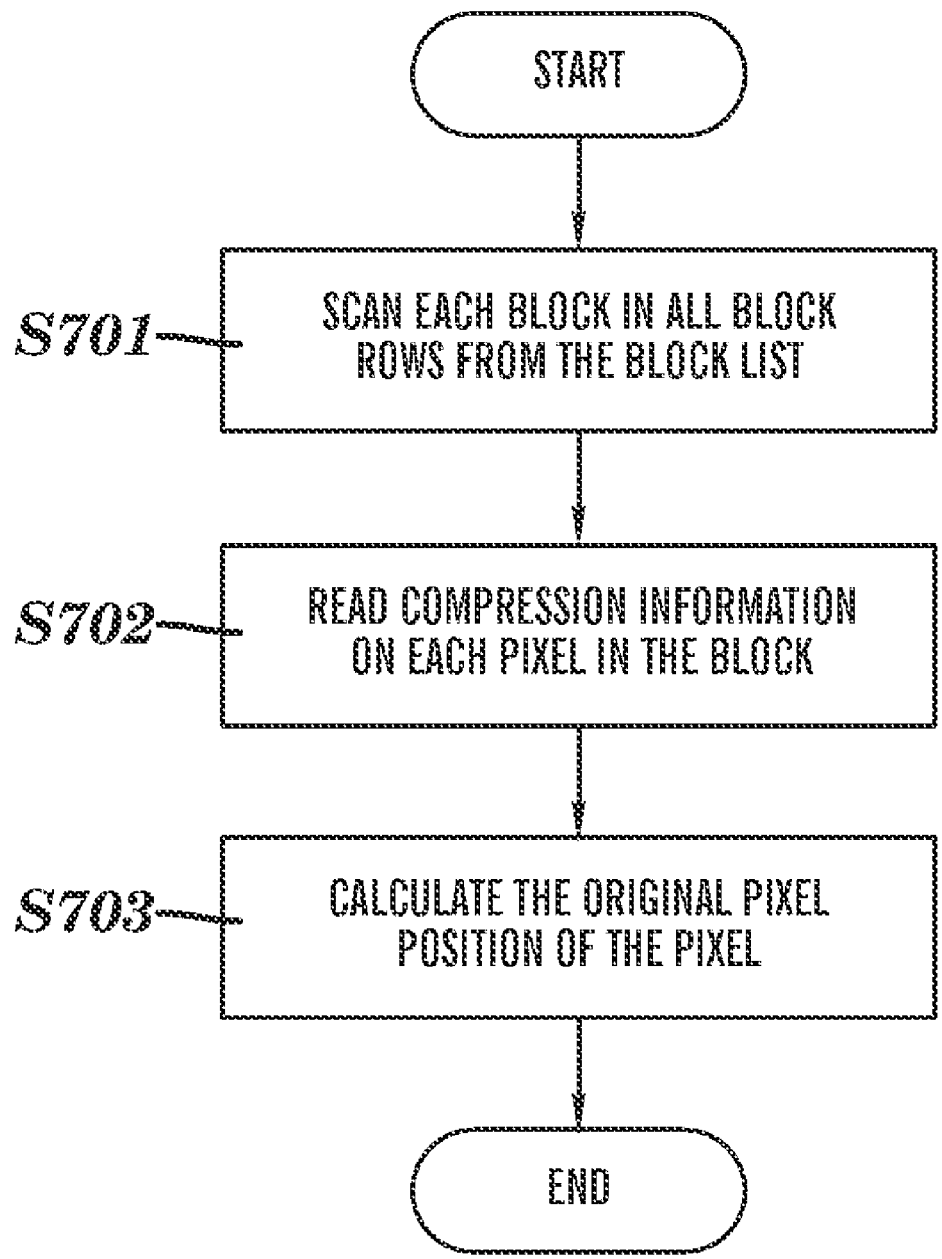
FIG. 7 is a flowchart of an image data decompression method according to the invention.

As shown in FIG. 7, in step S701, all the block rows BRI are scanned from the block list, and then a block BLOCK (I, J) contained in each block row is found directed to each block row.

In step S702, directed to the found block BLOCK (I, J), the compression information on each pixel saved in the data structure of the block is read. As shown in FIG. 5(b), the target pixel position P (SX, SY) and color encoding value of each pixel P (X, Y) are read.

Then in step S703, original pixel positions and their display colors of respective pixels are calculated. Specifically, the original pixel positions of the respective pixels, i.e., global coordinates X and Y of the pixels in the whole image, are calculated according to the target pixel position P (SX, SY) of each pixel P (X, Y) and the predetermined block width BW and block height BH, by means of an inverse operation of the equation (1). At the same time, the color encoding values of the read respective pixels are decoded to obtain the colors of the respective pixels.

As described above, at the 1:1 scale, a pixel point of each non-background color in the image represents a pipeline trace event, so that a horizontal coordinate X and longitudinal coordinate Y in the calculated original pixel position of the pixel point respectively correspond to the processor clock cycle count ET and instruction number IN of the original pipeline trace event. Thus, the pipeline trace raw data corresponding to all the pixels contained in each block of respective block rows saved in the block list are obtained, to thereby finish the decompression process of the compression information of the respective pixels.

In general, the pixel point of which both the processor clock cycle count ET and instruction number IN are zero is selected as an origin of the display window. The respective pixel is drawn in the display window according to its original pixel position (X, Y) and color determined as above described.

Figure 8B:
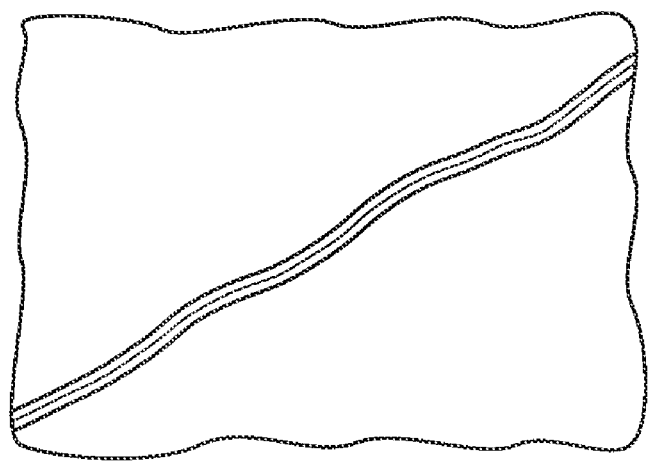
FIG. 8B is a schematic diagram showing an effect of displaying a partial pipeline trace analysis overview image specified by an indicator box in a predetermined display window.
Figure 8A:
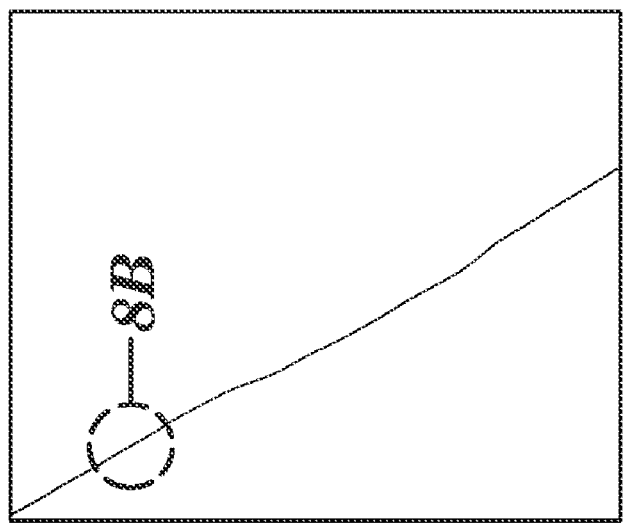
FIG. 8A is a schematic diagram showing an effect of displaying a pipeline trace analysis overview image in a predetermined display window.

The method of displaying in a display device the pixel data compressed using the image data compression method of the invention is discussed below. FIG. 8A is a schematic diagram showing a display effect of the overview image scaled down by a high scale, and FIG. 8B is a schematic diagram showing a display effect of displaying to scale a portion of the highly scaled overview image specified by an indicator box in FIG. 8A.

In the current graphical interface of the pipeline trace analysis software, the pipeline trace analysis overview image is usually displayed in a separate display window. However, the overview image generated based on the pipeline trace data is so large in scale that the whole overview image cannot be displayed in a display window at a usual scale. Therefore, a high scale is needed to display the overview view in the display window, as shown in FIG. 8A.

Figure 9:
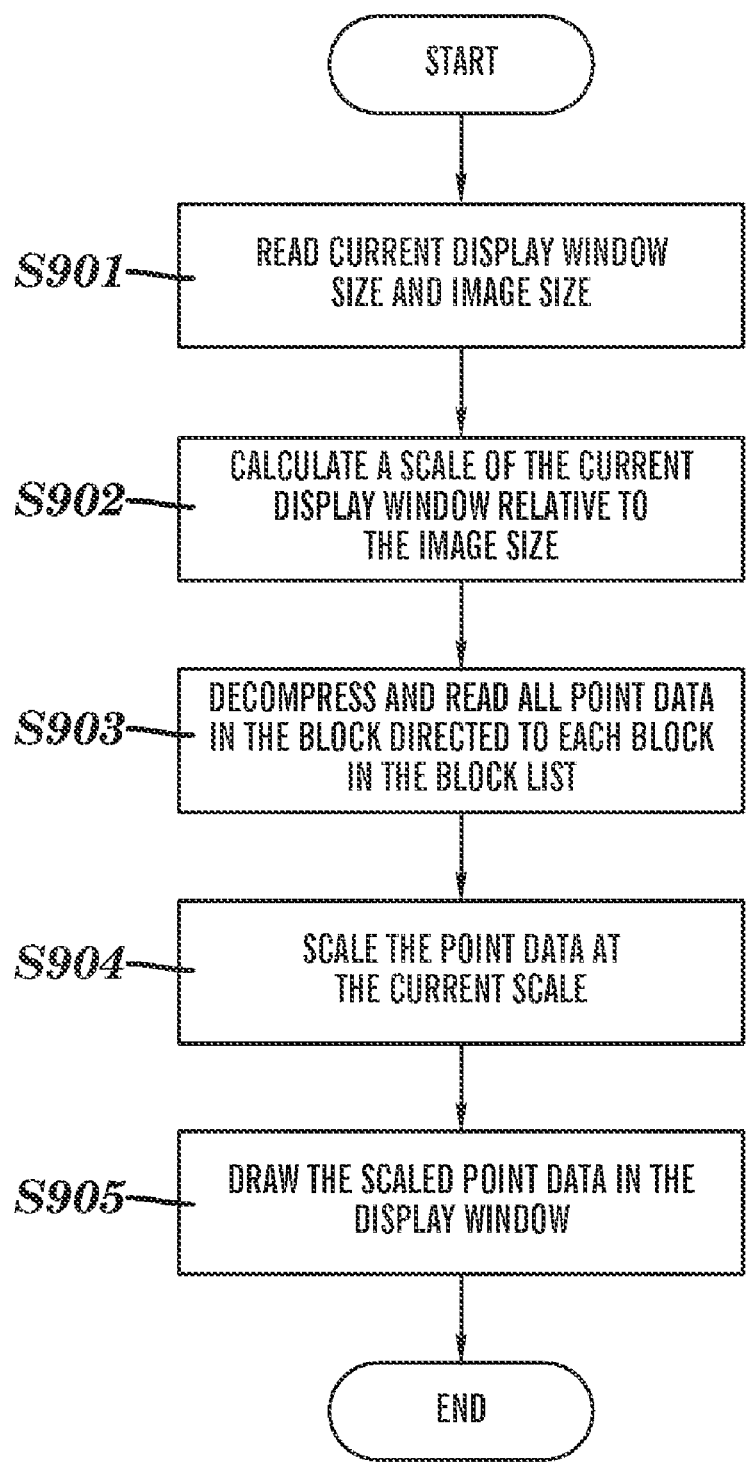
FIG. 9 is a flowchart of displaying the whole pipeline trace analysis image in a predetermined display window.

FIG. 9 is a flowchart of the display process of the overview image in FIG. 8A. In step S901, the width and height of the current window (a first display window) and the width and height of the overview image are read. In step S902, the read width and height of the current display window are respectively divided by the width and height of the overview image to calculate the scale of the current display window relative to the overview image.

In step S903, all the pixel point data in the block are decompressed directed to each block in the block list, according to the image data decompression method described above with reference to FIG. 7.

In step S904, according to the scale calculated in step S902, the pixel point data obtained by decompression in step S903 are scaled.

Then, in step S905, respective pixel points are drawn in the display window according to the scaled pixel point data.

In this way, by means of the image data compression method of the invention, a large amount of pipeline trace data can be compressed with a very small memory space, and, when the thus compressed image data are utilized to display the image, the pipeline trace analysis overview image can be displayed in a display window with a very small memory space and little computer processing amount, and the technical effect of displaying the whole overview image at a different scale can be achieved according to a different size of the display window.

As another embodiment of the image display method of the invention, a small portion of the whole pipeline trace analysis overview image can be displayed at a certain scale, the display effect of which is shown in FIG. 8B.

Figure 10:
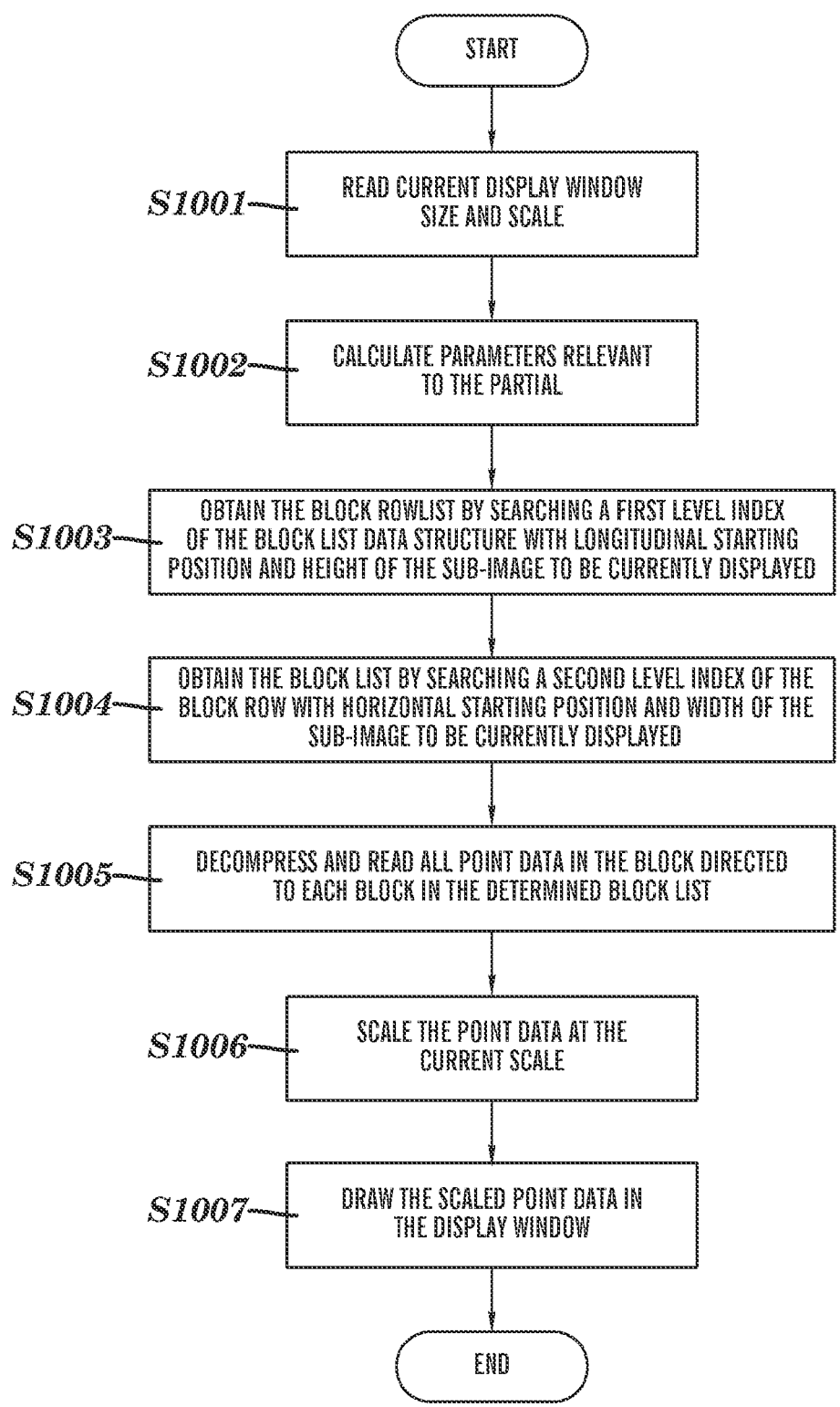
FIG. 10 is a flowchart of displaying the partial pipeline trace analysis overview image specified by an indicator box in a predetermined display window.

FIG. 10 shows a display processing flowchart in this case.

In step S1001, the width W2 and height H2 of the current display window (hereinafter referred to as a second display window to be distinguished from the above embodiment) and the scale of the second display window are obtained.

Then, in step S1002, according to the width W2 and height H2 and the scale of the second display window obtained in step S11001, relevant parameters of a partial overview image to be displayed are calculated.

Specifically, in order to quickly locate the pixels required to be displayed in the second display window, the invention first determines: coordinates of the top-left pixel of the second display window in the whole overview image; and the width and height of the partial overview image, to determine the number of the pixels to be displayed.

For the partial overview image to be displayed in the second display window, the top-left position P (X0', Y0') and its width and height (PW', PH') of the partial overview image are calculated according to the current user input. The top-left position (X0', Y0') of the partial overview image is the top-left position P(X20, Y20) of the second display window. The top-left position of the second display window can be determined by reading starting positions of the longitudinal and horizontal scroll bars of the second display window. The width PW' and height PH' of the partial overview image are determined by the width and height and the scale of the second display window.

Assume that the display scale of the second display window is defined as N:1 (i.e. displaying after scaling the whole image down by N), and the width and height respectively are (W2, H2), and the width PW' and height PH' of the partial overview image to be displayed are calculated as follows: PW'=W2*N; PH'=H2*N.

Then, the process proceeds to step S1003 where a first level index of the block list is searched with a binary tree search algorithm (a standard binary tree search algorithm) (see FIG. 4), and all the block rows completely or partially covered by the second display window, i.e. all the block rows with a row number I that satisfies Y0'/BH<=I<=(Y0'+H2)/BH, are found.

Then, the process proceeds to step S1004 where a second level index of the block list is searched with the binary tree search algorithm, directed to each block row $BR_I$ found in the step S1003, and individual blocks partially or completely covered by the second display window in the block row, i.e. all the blocks with a block number J that satisfies X0'/BW<=J<=(X0'+W2)/BW, are found.

Then, in step S1005, directed to each block (all the matched blocks) found by the steps S1003 and S1004, all the pixel point data contained in the block are decompressed.

In step S1006, according to the scale obtained in step S1001, the pixel point data obtained by decompression in step S1005 are scaled.

Finally, through step S1007, the respective pixel points are drawn in the display window according to the scaled pixel point data.

Thus, the present invention achieves the technical effect of quickly locating and displaying a portion of the generated large-scaled image by using the index of the image data.

The present invention can achieve other image display effects on the basis of the above embodiment. For example, when the user scrolls the display window along the horizontal and longitudinal directions of the display window, the present invention can re-calculate as described above starting coordinates and scale of the display window and the size of the partial overview image to be displayed so as to determine the pixels to be displayed. After the compression information on these pixels in the block list is decompressed with the decompression method of the invention, these pixel points are drawn in a new display window.

In addition, when the display window is scaled down/up by dragging a mouse or selecting menu options, the pixels to be displayed are determined also by re-calculating as described above the scale of the display window and the size of the partial overview image to be displayed, and, after the compression information on these pixels in the block list is decompressed with the decompression method of the invention, these pixels points are drawn in a new display window.

In addition, the analyzing tool interface of the pipeline trace analysis software also has two linked views, one being called a "navigator view" for displaying a brief pipeline trace analysis image, and the other being called a "detail view" for displaying a detailed pipeline trace analysis image of a portion of the navigator view specified by an indicator box, wherein the indicator box indicates the position and size of the portion displayed in the detail view window, in the overview image displayed in the navigator view window. These two views are always synchronously displayed for the user to choose. These two views provide synchronous displays of different granularities to help the user to analyze possible performance problems in code running in the processor pipeline. FIGS. 8A and 8B in combination show an example of these two views.

Figure 11:
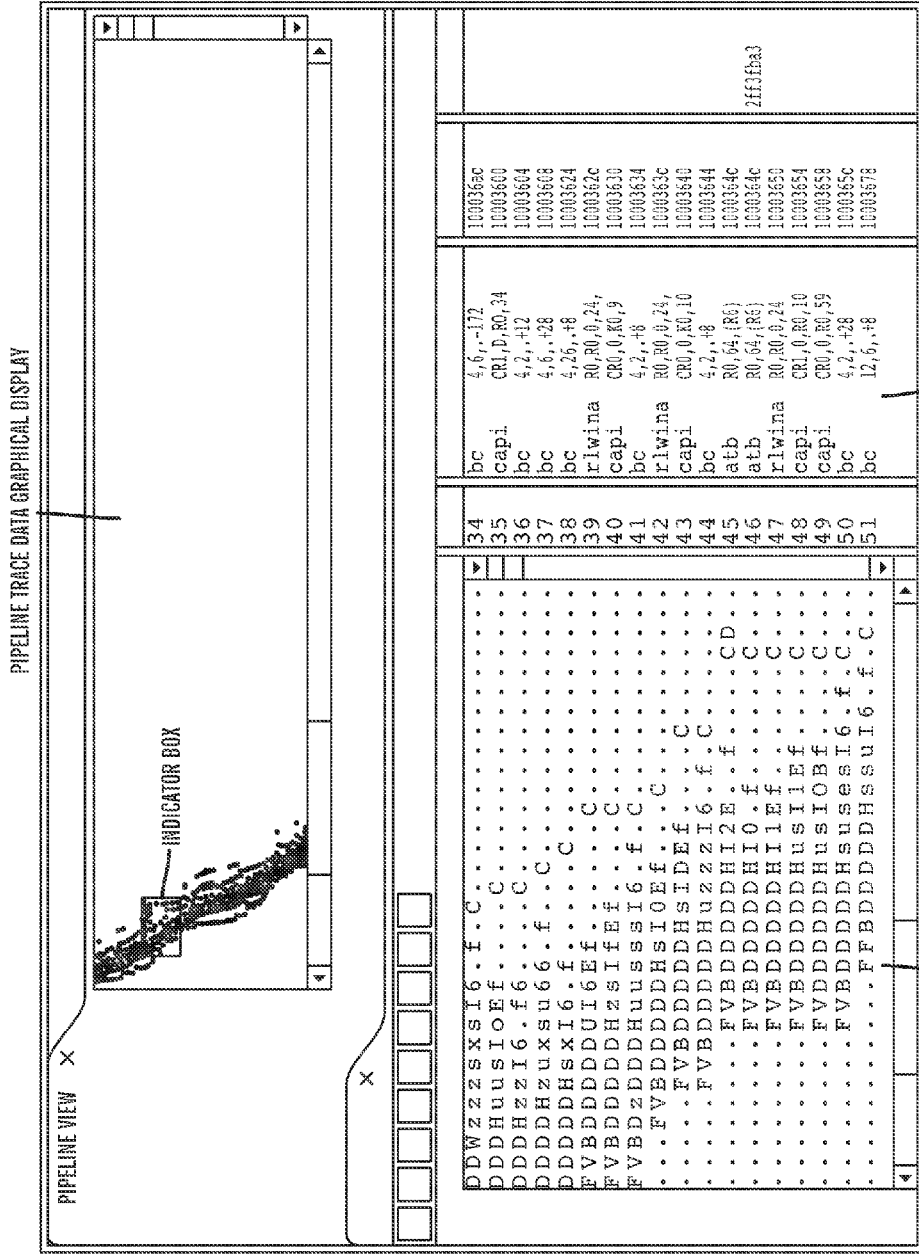
FIG. 11 is an example of synchronously displaying the computer processor pipeline raw trace data as text and graphical representation.

In addition, the present invention can not only display the image for overviewing the pipeline statistics but also synchronously display detailed text information on the pipeline statistics. FIG. 11 shows an example of displaying the computer processor trace raw data into text and graphical representations. The lower text display window in FIG. 11 displays the effect of text details. This display window is split into left and right two parts:

The left part displays detailed pipeline trace data. In this two-dimensional table image, the horizontal axis represents the computer processor clock cycle that increases from left to right; the longitudinal axis represents the computer processor instruction number that increases from top to bottom. Each character in the table image represents one (or more, distinguished by color) pipeline trace events. All the events in the same row belong to the same instruction.

The right part displays attached information on each instruction in the form of text. Each row in the right window and left window are displayed in alignment and scrolled up and down simultaneously. The combination of these two windows collectively displays the pipeline trace data and attached information of the instruction.

(1) The graphical display window in the upper part of FIG. 11 graphically displays the pipeline trace analysis overview image.

The graphical display window in the upper part of FIG. 11 and the text display window in the lower part are always synchronously displayed. That is, by moving the indicator box in the overview window via the mouse, display contents in the text display window will synchronously scroll to a position indicated by the indicator box; by dragging the longitudinal/horizontal scroll bar in the text display window to scroll the display contents in the text display window, the indicator box in the graphical display window will synchronously move; by dragging the bottom-right corner of the graphical display window to adjust the size of the image display window, the indicator box in the graphical display window will synchronously change the size.

The forgoing has described in detail how to calculate the starting coordinates and scale of the display window and the size of the partial overview image to be displayed with reference to FIGS. 9 and 10, so as to enable those skilled in the art to absolutely achieve the above image display effects. Many embodiments for synchronous display of graphical and text information have been disclosed in the prior art. The synchronous display of the two can be achieved by any means and the description thereof is thus omitted.

The above has described examples of displaying the pipeline trace analysis image of the invention. However, the invention is not limited to only the above means.

It is easily appreciated according to a specific pixel distribution of the pipeline trace analysis image that, in the image display method according to the invention, the running time for the binary tree search algorithm to search the block list for all the block rows completely or partially covered by the current display window is in direct proportion to logarithm (image height/block height). For each block row found in the above step, the process of finding all individual blocks completely or partially covered by the current display window by means of the binary tree search algorithm and the process of drawing the pixels in the display window after the pixel data contained in all the blocks are decompressed run for an approximately constant time. Since the image height is in direct proportion to the logarithm of the data amount of the input pipeline trace raw data, in summary, when the image display method of the invention locates the display of the partial image, its running time is in direct proportion to the logarithm of the data amount of the input pipeline trace raw data. Such a computation complexity is acceptable for smoothly scrolling and zooming in/out the pipeline trace analysis image. In addition, by compressing and storing only the information on the non-background pixels in each block, the present invention is also very efficient in saving memory space.

What is claimed is:

1. An image data compression method for computer processor pipeline trace data, comprising:
   using a computer, dividing a computer processor pipeline statistic image to be displayed into a plurality of blocks with predetermined block width and block height;
   creating a block list for indexed blocks containing meaningful pixels in said divided blocks such that indexed blocks associated with each other, wherein said meaningful pixels are pixels corresponding to the computer processor pipeline raw trace data;
   compressing original pixel information on the meaningful pixels in said indexed blocks and storing it in said block list;
   reading pipeline trace events one by one from said computer processor pipeline raw trace data;
   determining pixel position and color of said meaningful pixel corresponding to the pipeline trace event directed to each pipeline trace event read;
   judging the indexed block to which said meaningful pixel belongs based on the determined pixel position of said meaningful pixel;
   generating said block list based on red-black tree index information of the judged indexed block; and
   generating block information on said indexed block based on the pixel position and color of said meaningful pixel determined in said pixel information determining step and a sequence number of said indexed block judged in said indexed block judging step.

2. An image data compression method according to claim 1, wherein said computer processor pipeline raw trace data comprise pipeline trace event information and trace data configuration information, said pipeline trace event information comprises event category, event time, instruction number and attached information, and said trace data configuration information comprises a corresponding table between event categories and pixel colors.

3. An image data compression method according to claim 2, wherein said determining pixel position and color comprises:
   determining the pixel position of said meaningful pixel corresponding to the pipeline trace event, with said event time read in said trace event reading step as a horizontal coordinate of said meaningful pixel and the instruction number read as a longitudinal coordinate of said meaningful pixel; and determining the pixel color of said meaningful pixel corresponding to the pipeline trace event, based on said corresponding table between event categories and pixel colors read in said trace event reading step.

4. An image data compression method according to claim 1, wherein said judging the indexed block comprises:

obtaining a row number of said indexed block to which said meaningful pixel belongs by dividing exactly said determined longitudinal coordinate of said meaningful pixel by said predetermined block height;

obtaining a column number of said indexed block to which said meaningful pixel belongs by dividing exactly said determined horizontal coordinate of said meaningful pixel by said predetermined block height; and determining the indexed block from the obtained row number and column number of said indexed block.

5. An image data compression method according to claim 1, wherein said generating a block list further comprises:

forming a block row by associating a plurality of blocks with each other by way of the red-black tree index data structure; and forming said block list by associating a plurality of said block rows with each other by way of the red-black tree index data structure.

6. An image data compression method according to claim 5, wherein said forming said block row comprises:

storing block row information, said block row information comprising a block row number for uniquely identifying the block row and red-black index information on all the blocks within the block row.

7. An image data compression method according to claim 1, wherein said generating block information comprises:

determining a position of a top-left pixel of said block in said whole display image; and determining compression information on said meaningful pixel.

8. An image data compression method according to claim 7, wherein said determining compression information comprises:

converting an original pixel position of said meaningful pixel into a target pixel position of said meaningful pixel in the indexed block to which said meaningful pixel belongs; and encoding a color of said meaningful pixel.

9. An image data compression apparatus for computer processor pipeline trace data comprising:

a block divider for dividing a computer processor pipeline statistic image to be displayed into a plurality of blocks with predetermined block width and block height;

a block list creator for creating a block list for indexed blocks containing meaningful pixels in said divided blocks such that said indexed blocks are associated with each other, wherein said meaningful pixels are pixels corresponding to the computer processor pipeline raw trace data; and a pixel information compressor for compressing original pixel information on the meaningful pixels in said indexed blocks and storing it in said block list, comprising:

a trace event reader for reading pipeline trace events one by one from said computer processor pipeline raw trace data;

a pixel information locator for determining pixel position and color of said meaningful pixel corresponding to the pipeline trace event directed to each read pipeline trace event;

an indexed block evaluator for judging the indexed block to which said meaningful pixel belongs based on the determined pixel position of said meaningful pixel;

a block list generator for generating said block list based on red-black tree index information of the judged indexed block; and a block information generator for generating block information on said indexed block based on the pixel position and color of said meaningful pixel determined in said pixel information determining unit and a sequence number of said indexed block judged in said indexed block judging unit, and storing it in said block.

10. An image data compression apparatus according to claim 9, wherein said computer processor pipeline raw trace data comprise pipeline trace event information and trace data configuration information, said pipeline trace event information comprises event category, event time, instruction number and attached information, and said trace data configuration information comprises a corresponding table between event categories and pixel colors.

11. An image data compression apparatus according to claim 10, wherein said pixel information locator comprises:

determining the pixel position of said meaningful pixel corresponding to the pipeline trace event, with said event time read in said trace event reader as a horizontal coordinate of said meaningful pixel and the instruction number as a longitudinal coordinate of said meaningful pixel; and determining the pixel color of said meaningful pixel corresponding to the pipeline trace event, based on said corresponding table between event categories and pixel colors read in said trace event reader.

12. An image data compression apparatus according to claim 9, wherein said indexed block evaluator comprises:

obtaining a row number of said indexed block to which said meaningful pixel belongs by dividing exactly said determined longitudinal coordinate of said meaningful pixel by said predetermined block height;

obtaining a column number of said indexed block to which said meaningful pixel belongs by dividing exactly said determined horizontal coordinate of said meaningful pixel by said predetermined block height; and determining the indexed block from the obtained row number and column number of said indexed block.

13. An image data compression apparatus according to claim 9, wherein said block list generator further comprises:

a block row creator for forming a block row by associating a plurality of blocks with each other by means of the red-black tree index data structure; and a block list creator for forming said block list by associating a plurality of said block rows with each other by means of the red-black tree index data structure.

14. An image data compression apparatus according to claim 9, wherein said block information generator comprises:

a block position determiner for determining a position of a top-left pixel of said block in said whole display image; and a compression information determiner for determining compression information on said meaningful pixel.

* * * * *